US00RE36883E

United States Patent [19]

Krenzel

[11] E Patent Number: Re. 36,883

[45] **Reissued Date of Patent: *Sep. 26, 2000**

[54] HOLDER FOR A FLASHLIGHT

[76] Inventor: Ronald L. Krenzel, 6595 Odell, Suite I, Boulder, Colo. 80301

[ * ] Notice: This patent issued on a continued prosecution application filed under 37 CFR 1.53(d), and is subject to the twenty year patent term provisions of 35 U.S.C. 154(a)(2).

[21] Appl. No.: 08/582,272

[22] Filed: Jan. 3, 1996

Related U.S. Patent Documents

Reissue of:

[64] Patent No.: 5,276,596
Issued: Jan. 4, 1994
Appl. No.: 07/902,940
Filed: Jun. 23, 1992

[51] Int. Cl.[7] ..... F21L 15/14

[52] U.S. Cl. ..... 362/191; 362/396; 362/419

[58] Field of Search ..... 362/396, 421, 362/189, 190, 191, 198, 199, 418, 410; 248/104, 106, 160; D26/138, 140, 60, 62, 65; 446/73, 485, 368, 375; 285/166

[56] References Cited

U.S. PATENT DOCUMENTS

| | | | |
|---|---|---|---|
| D. 321,062 | 10/1991 | Bonbright | D26/140 |
| 599,543 | 2/1898 | Whitaker | 248/160 |
| 1,566,502 | 12/1925 | Palmer . | |
| 2,467,954 | 4/1949 | Becker | 240/10.6 |
| 2,706,610 | 4/1955 | Roberts | 248/168 |
| 3,161,392 | 12/1964 | Kopec et al. | 248/104 |
| 3,180,600 | 4/1965 | Kopec | 248/104 |
| 3,307,026 | 2/1967 | Kramer | 240/4 |
| 3,418,461 | 12/1968 | Sedlock | 240/52.5 |
| 3,584,822 | 6/1971 | Oram | 248/160 |
| 4,114,847 | 9/1978 | Bogensberger | 248/104 |
| 4,117,535 | 9/1978 | Holt | 362/382 |
| 4,305,560 | 12/1981 | Ban | 362/418 |
| 4,907,137 | 3/1990 | Schladitz et al. | 362/145 |
| 5,103,384 | 4/1992 | Drohan | 362/191 |
| 5,154,483 | 10/1992 | Zeller | 362/198 |
| 5,385,500 | 1/1995 | Schmidt | 446/485 |
| 5,449,206 | 9/1995 | Lockwood | 285/261 |
| 5,517,392 | 5/1996 | Rousso et al. | 362/421 |

FOREIGN PATENT DOCUMENTS

| | | | |
|---|---|---|---|
| 82657 | 4/1957 | Denmark | 362/410 |
| 361338 | 5/1962 | Switzerland | 362/410 |

OTHER PUBLICATIONS

Stuart Schneider; "Collecting Flashlights with Value Guide"; 1996.

Loc–Line The Original Modular Hose System brochure, May, 1991.

"Unveiling the Solution to your High Performance U/W Lighting Needs"; 1 page Advertisement, no date.

"The SeaBlaze Lighting System"; *Skin Diver*; various issues; 7 pages, 1990.

Light & Motion s "Infinity Strobe Arm: Gives you the Freedom to Shoot!"; Advertisement; 3 pages, no date.

*Primary Examiner*—Stephen Husar
*Attorney, Agent, or Firm*—Sheridan Ross P.C.

[57] ABSTRACT

This invention provides an elongated flexible member that is capable of being formed into a plurality of differing shapes so that it can be supported at a variety of locations and has retaining means for retaining it in a desired shape so that a holder connected to one end thereof can hold a flashlight at any desired position relative thereto.

30 Claims, 2 Drawing Sheets

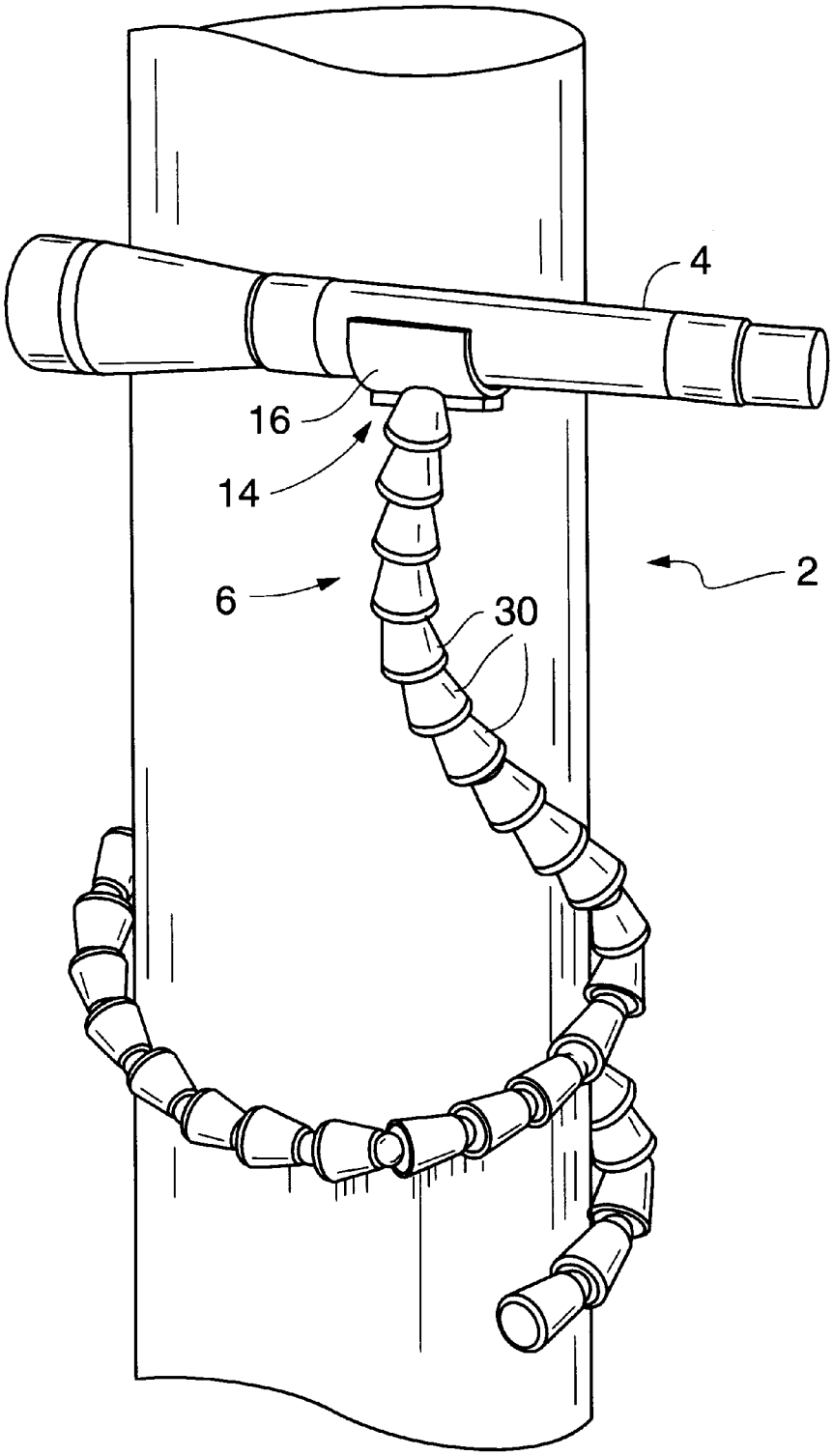
Fig. 5
(NEW)

HOLDER FOR A FLASHLIGHT

Matter enclosed in heavy brackets [ ] appears in the original patent but forms no part of this reissue specification; matter printed in italics indicates the additions made by reissue.

FIELD OF THE INVENTION

This invention relates generally to apparatus for use in providing light where necessary and more particularly, to a portable device for holding a flashlight at any desired location.

BACKGROUND OF THE INVENTION

There are many times when a person, who is alone and doing some kind of work, needs a third hand. This is particularly true when a flashlight has to be used so that such a person can see what is being worked on. Flashlights have been laid on any available objects in an effort to provide light at a desired location, but often without good results. Small flashlights have even been held in the mouth of the worker. Thus, there exists a need for a readily portable device that can be used anywhere to hold a flashlight at a desired location to provide needed light.

BRIEF DESCRIPTION OF THE INVENTION

This invention relates to a device that is readily portable and can be used substantially anywhere to hold a flashlight to provide needed light at a desired location.

In a preferred embodiment of the invention, the device comprises an elongated flexible member that is capable of being moved into a plurality of differing shapes. Retaining means are provided for retaining the elongated flexible member in a desired shape. Holding means are provided on one end portion of the elongated flexible member for holding a flashlight. Generally, the desired shape has a base portion which is adapted to be placed on a fixed surface. A generally vertically extending portion projects upwardly from the base portion. The holding means are connected to an end portion of the elongated flexible member by suitable connecting means, such as a rivet. The holding means comprise a member having a generally arcuate cross-sectional configuration having an arcuate extent greater than 180 degrees and a longitudinal axis. The member is formed from a resilient material, such as a plastic material, and has spaced apart terminal end portions which may be spread apart so that a flashlight can be inserted into the member and so that the terminal end portions will resile back to exert frictional forces on the flashlight to restrain relative movement between the member and the flashlight. The flashlight also has a longitudinal axis so that when the flashlight is inserted into the member, the longitudinal axes of the member and the flashlight are in a parallel relationship.

The elongated flexible member comprises a plurality of interconnected segments each of which has a central body portion, a male end portion, a female end portion and a longitudinal axis. The male end portion has an outer surface having the configuration of a frustum of a sphere and the female end portion has an inner surface having the configuration of a frustum of a sphere and is dimensioned to receive the male end portion. The outer and inner surfaces are dimensioned so that there is frictional contact therebetween when a male end portion is inserted into a female end portion. This permits one segment to be moved relative to another segment so that their longitudinal axes are either in or out of alignment and permits unrestricted rotational movement between interconnected segments. Therefore, since the holding means is connected to the end segment, it permits the same type of movement of the flashlight. Also the frictional forces retain the two segments at whatever relative position they have been moved to. Preferably, each segment is made from a plastic material.

In another preferred embodiment of the invention, attachment means are provided for attaching one end of the elongated flexible member to a fixed support such as an internally threaded socket mounted at a fixed location. The attachment means comprise an adapter having a central body section, an externally threaded end section, a male end section and a longitudinal axis. The male end section has an outer surface having a configuration similar to the outer surface of the male end portion so that it can be inserted into a female end portion and function as described above relative to interconnected segments. The central body section has an outer configuration adapted to be received in a tool so that the adapter can be rotated to secure the externally threaded end section into the internally threaded socket.

BRIEF DESCRIPTION OF THE DRAWING

Illustrative and presently preferred embodiments of the invention are shown in the accompanying drawing in which:

*FIG. 5 is a perspective view of another embodiment of this invention.*

DETAILED DESCRIPTION OF THE INVENTION

Figure 1:
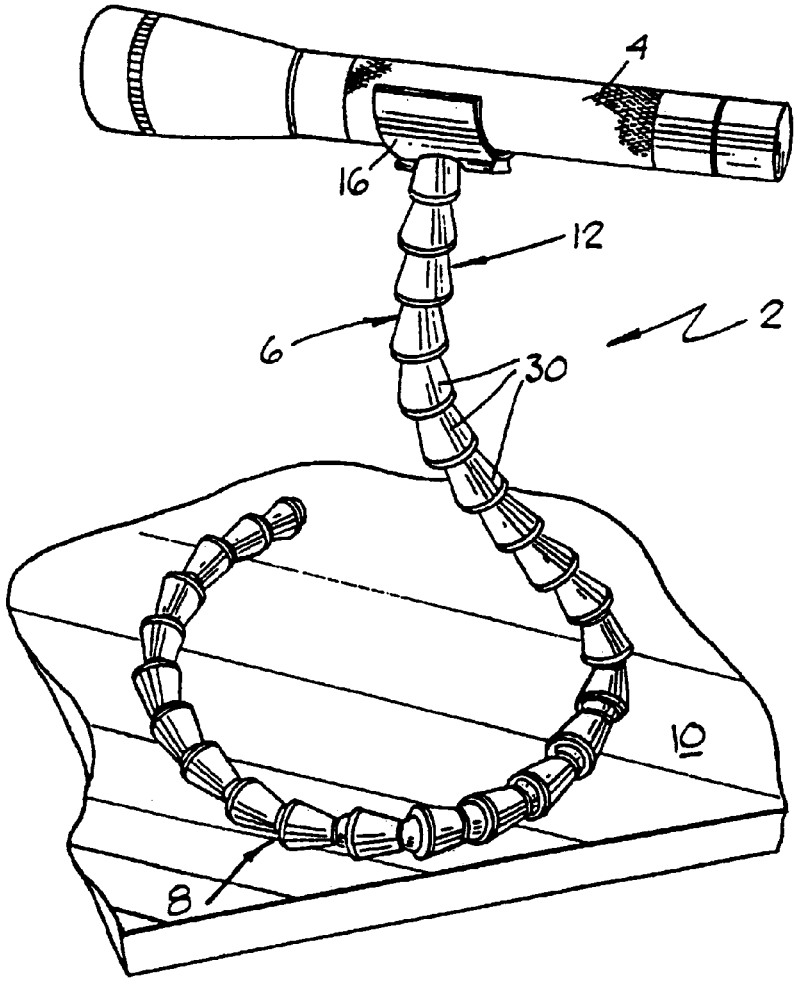
FIG. 1 is a perspective view of a device for holding a flashlight of this invention.
Figure 2:
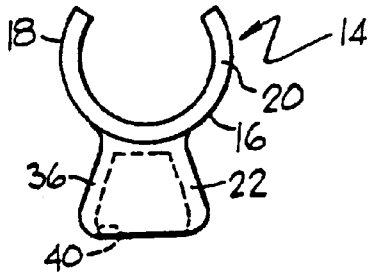
FIG. 2 is an end elevational view of the holding means.

In FIG. 1, there is disclosed a readily portable device 2 for holding a flashlight 4 having a longitudinal axis. The device 2 comprises an elongated flexible member 6 which is capable of being moved into a plurality of differing shapes. The shape illustrated in FIG. 1 comprises a base portion 8 adapted to be placed in contact with a support surface 10 and a generally vertically extending portion 12. Holding means 14 (FIG. 2) are provided for holding the flashlight 4 and comprise an open-ended arcuately-shaped member 16 having an arcuate extent greater than 180 degrees and having a longitudinal axis. The member 1 is preferably formed from a resilient material such as polyethylene, such as that marketed under the trade designation "DELRIN", so that the end portions 18 and 20 may be moved apart as the flashlight 4 is inserted therethrough and then spring back to retain the flashlight 4 therein. Reinforcing means 22 are preferably integrally molded with the member 16. As illustrated in FIG. 1, when the flashlight 4 has been inserted into the member 16, the longitudinal axes thereof are in a parallel relationship.

[The] *As shown in FIG. 5, the* elongated flexible member 6 may be formed into a variety of shapes other than that illustrated in FIG. 1. Such shapes include wrapping a portion of it around a pipe or rod for working under a sink, wrapping a portion around any convenient part when working on an engine and in fact, can be used anywhere.

Figure 3:
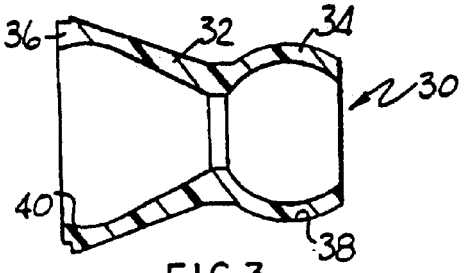
FIG. 3 is a view in cross-section of one of the segments; [and]

The elongated flexible member 6 is of the type marketed by Lockwood Products, Inc. under the trade designation LOC-LINE [( )] (*R*). This product is used a modular hose system for providing high volume fluids for cooling tools, such as in cutting operations. The elongated flexible member 6 comprises a plurality of interconected segments 30. As illustrated in FIG. 3, each segment 30 comprises a central body portion 32, a male end portion 34 and a female end portion 36. The male end portion 34 has an outer surface 38 comprising a frustum of a sphere and the female end portion 36 has a mating inner surface 40 comprising a frustum of a sphere which is dimensioned so that, when the male end portion 34 is inserted into the female end portion 36, there is frictional contact between the mating outer and inner surfaces 38 and 40. These frictional forces function as retaining means to hold one segment 30 at any desired location relative to an interconnected segment 30. However, these frictional forces can be overcome which permits interconnected segments 30 to be moved relative to each other so that their longitudinal axes are either in or out of alignment and permits unrestricted relative rotational movement therebetween. The member 16 is preferably provided with a female end portion 36 having an inner surface 40 so that it can be connected to the male end portion 34 of the end segment 30 or it can be connected to an end segment 30 by any suitable means, such as a rivet. This connection permits the flashlight 4 to have the same relative movements as the interconnected segments, as described above. The length of the elongated flexible member 16 can be changed by adding or removing segments 30.

Figure 4:
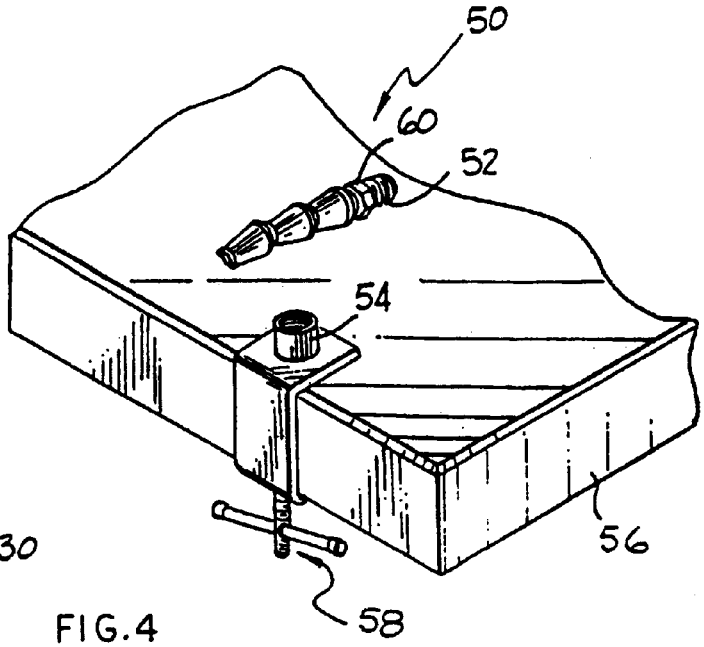
FIG. 4 is a perspective view of another embodiment of this invention*; and*

Another embodiment of the invention is illustrated in FIG. 4. An adapter 50 has a male end portion 34 that is dimensioned to fit into a female end portion 36 and has an externally threaded end portion 52. An internally threaded socket 54 is secured to a ledge 56 by clamping 35 means 58. The adapter 50 has a central body section 60 having an outer surface configuration so that a tool can be applied thereto and rotated to attach the adapter 50 and therefore, the elongated flexible member 6, to the socket 54.

It is contemplated that the inventive concepts herein described may be variously otherwise embodied and it is intended that the appended claims be construed to include alternative embodiments of the invention except insofar as limited by the prior art.

What is claimed is:

1. A device for holding a flashlight at a desired location comprising:

an elongated flexible member capable of being moved into a plurality of differing shapes, *the elongated flexible member comprising a plurality of interconnected segments*;

retaining means for retaining said elongated flexible member in a desired shape;

holding means connected to an end portion of said elongated flexible member for holding a flashlight at a desired location;

attachment means comprising a portion of said elongated flexible member itself for attaching said elongated flexible member on a fixed object; and wherein said attachment means comprise:

a central body section, a male end section *at an end of the central body section and*, an externally threaded end section [and] *at another end of the central body section, the attachment means having* a longitudinal axis; and said male end section having an outer surface having a configuration similar to that of [said] *a* male end portion of [said] *a* segment.

2. A device as in claim 1 and further comprising:

connecting means for connecting said holding means to said end portion of said elongated flexible member to permit relative angular and rotational movement between said holding means and the remaining portion of said elongated flexible member.

3. A device as in claim 1 wherein said holding means comprises:

a member having a generally arcuate cross-sectional configuration and a longitudinal axis; and said member having an arcuate extent greater than 180 degrees and having spaced apart terminal end portions.

4. A device as in claim 3 wherein:

said member being formed from a resilient material so that said terminal end portions may be spread apart as said flashlight is inserted therein and function to resile back and exert a resilient force on said flashlight to hold it at a desired location.

5. A device as in claim 4 wherein:

[said elongated flexible member comprises a plurality of interconnected segments] *the flashlight comprises a power source connected to an end of the elongated flexible member*.

6. A device as in claim 5 wherein each of said segments comprises:

a central body portion, a male end portion *at an end of the central body portion, and* a female end portion [and] *at the other end of the central body portion, each of the segments having* a longitudinal axis.

7. A device as in claim 6 wherein:

said male end portion *of a first interconnected segment* having an outer surface comprising a frustum of a sphere; and said female end portion *of a second interconnected segment* having an inner surface comprising a frustum of a sphere and dimensioned to receive said male end portion *of the first interconnected segment* to permit relative movement between *the* interconnected *first and second* segments so that [their] *the* longitudinal axes *of the first and second segments* are either in or out of alignment and permit[s] unrestricted rotational movement therebetween.

8. A device as in claim 7 wherein said retaining means comprise:

frictional forces between said outer and inner surfaces when said male end portion *of the first* segment is within said female end portion *of the second segment* to retain interconnected segments in the shape to which they have been moved.

9. A device as in claim 8 wherein:

each or said segments is formed from a plastic material.

10. A device as in claim 1 wherein:

said central body section having an outer surface configuration for receiving a tool for rotating said attachment means.

*11. A device for positioning a flashlight comprising:*

(*a*) *an elongated flexible member capable of being formed into a plurality of differing shapes, wherein said elongated flexible member comprises a plurality of discrete rotatable interconnected segments, each of the discrete rotatable interconnected segments having a male end and a female end for connecting to an adjacent discrete rotatably interconnected segment, whereby the elongated flexible member is capable of being wrapped completely around a portion of an object for retaining said elongated flexible member in a desired position; and*

(b) *a flashlight engaging said elongated flexible member, wherein each discrete rotatable interconnected segment in said plurality of discrete rotatable interconnected segments has unrestricted rotational movement relative to an adjacent discrete rotatable interconnected segment and wherein the female end has a socket formed by a frustum of a sphere defined by an inner surface of the female end and an opening for receiving the male end of an adjacent rotatably interconnected segment, the opening having a perimeter and a plurality of points on the perimeter of the opening, wherein a plurality of lines connects all of the points on the perimeter of the opening with a center of the frustum of a sphere and all of the lines form a plurality of angles with a longitudinal axis of the female end, each of the plurality of angles having a magnitude, such that the magnitudes of all of the plurality of angles are substantially the same.*

*12. The device of claim 11, wherein each of said discrete rotatable interconnected segments comprises a central body portion, a male end portion at an end of the central body portion, and a female end portion at another end of the central body portion and each of the discrete rotatable interconnected segments has a longitudinal axis; and*

(i) *said male end portion of a first segment has an outer surface comprising a frustum of a sphere; and*

(ii) *said female end portion of a second segment, that is rotatably interconnected to the first segment, has an inner surface comprising a frustum of a sphere and dimensioned to receive said male end portion of the first segment to permit relative movement between the rotatably interconnected first and second segments so that the longitudinal axes of the first segment and the second segment are either in or out of alignment and to permit rotational movement therebetween.*

*13. The device of claim 11, wherein said elongated flexible member comprises retaining means for retaining said elongated flexible member in a desired shape to maintain said device in said desired position on said object.*

*14. The device of claim 13, wherein said desired shape is a loop and a portion of said object is contained within said loop.*

*15. A device for positioning a flashlight comprising:*

(a) *an elongated flexible member capable of being wrapped completely around a portion of an object for retaining the elongated flexible member in a desired position, said elongated flexible member comprising a plurality of discrete, rotatably connected segments wherein a first end of each of said plurality of discrete, rotatably connected segments includes a female end portion having a longitudinal axis and a second end of each of said plurality of discrete, rotatably connected segments includes a male end portion having a longitudinal axis, the female end portion being connected to the male end portion of an adjacent discrete, rotatably connected segment to permit relative movement between adjacent discrete, rotatably connected segments so that the longitudinal axes of connected female and male end portions of adjacent discrete, rotatably connected segments are either in or out of alignment; and*

(b) *a flashlight connected to said elongated flexible member, wherein said female end portion of each of the plurality of discrete, rotatably connected segments has an inner surface comprising a frustum of a sphere wherein the frustum of a sphere has an opening sized to receive the male end portion of an adjacent discrete, rotatably connected segment and wherein substantially of the opening is contained in a common plane to provide each of the plurality of discrete, rotatably connected segments with substantially identical degrees of movement in all directions relative to an adjacent discrete, rotatable connected segment.*

*16. A device for positioning a flashlight comprising:*

(a) *an elongated flexible member capable of being wrapped completely around a portion of an object for retaining the elongated flexible member in a desired position, said elongated flexible member comprising a plurality of discrete, rotatable connected segments wherein a first end of each of said plurality of discrete, rotatable connected segments includes a female end portion having a longitudinal axis and a second end of each of said plurality of discrete, rotatably connected segments includes a male end portion having a longitudinal axis, the female end portion being connected to the male end portion of an adjacent discrete, rotatably connected segment to permit relative movement between adjacent discrete, rotatable connected segments so that the longitudinal axes of connected female and male end portions of adjacent discrete, rotatable connected segments are either in or out of alignment; and*

(b) *a flashlight connected to said elongated flexible member, wherein a first segment is rotatable relative to an adjacent segment to a plurality of differing positions and all of the positions to which the first segment is rotatable relative to the adjacent segment define a first set of positions and, in the first set of positions, the longitudinal axis of the first segment is offset by a plurality of angles relative to a longitudinal axis of the adjacent segment, each of the plurality of angles having a magnitude, and the magnitudes of the plurality of angles are substantially the same.*

*17. A device for positioning a flashlight comprising:*

(a) *an elongated flexible member capable of being wrapped completely around a portion of an object for retaining the elongated flexible member in a desired position, said elongated flexible member comprising a plurality of discrete, rotatably connected segments wherein a first end of each of said plurality of discrete, rotatably connected segments includes a female end portion having a longitudinal axis and a second end of each of said plurality of discrete, rotatably connected segments includes a male end portion having a longitudinal axis, each of the female end portions in the plurality of discrete, rotatably connected segments being connected to the male end portion of an adjacent discrete, rotatably connected segment to permit relative movement between adjacent discrete, rotatably connected segments so that the longitudinal axes of connected female and male end portions of adjacent discrete, rotatably connected segments are either in or out of alignment; and*

(b) *a flashlight connected to said elongated flexible member wherein each of said discrete, rotatably connected segments comprises a central body portion, said male end portion at one end of the central body portion and said female end portion at another end of the central body portion and wherein:*

(i) *said male end portion of a first segment of said plurality of discrete, rotatably connected segments has an outer surface comprising a frustum of a sphere; and*

(ii) *said female end portion of a second segment of said plurality of discrete, rotatably connected segments,*

*the second segment being rotatably connected with the first segment, has an inner surface comprising a frustum of a sphere and dimensioned to receive said male end portion of the first segment to permit relative movement between the rotatably connected first and second segments so that the longitudinal axes of the male end portion of said first segment and the female end portion of the second segment are either in or out of alignment and to permit rotational movement therebetween.*

*18. The device of claim 17, wherein said elongated flexible member is formed into a shape comprising at least a portion of a loop.*

*19. The device of claim 17, wherein said elongated flexible member is formed into a shape comprising an open loop.*

*20. The device of claim 17, wherein said elongated flexible member comprises retaining means for retaining said elongated flexible member in a desired shape.*

*21. A method for holding a flashlight in a desired position comprising:*

*providing said flashlight with an elongated flexible member comprising a plurality of discrete, rotatably interconnected segments, each of said plurality of discrete, rotatably interconnected segments having a male end and a female end; and*

*wrapping at least a portion of said elongated flexible member around an object in order to retain said flashlight in a desired position.*

*22. The method of claim 21, wherein said wrapping step comprises:*

*forming said at least a portion of said elongated flexible member into a loop around said object.*

*23. The method of claim 21, wherein after said wrapping step said elongated flexible member is in a desired shape and further comprising:*

*maintaining said elongated flexible member in said desired shape.*

*24. A method for using a flashlight positioning device comprising an elongated flexible member comprising a plurality of discrete, rotatably interconnected segments, each discrete, rotatably interconnected segment having a central body portion, a male end portion at a first end of the central body portion and a female end portion at a second end of the central body portion and operatively attached to a flashlight comprising wrapping at least a portion of said elongated flexible member around an object in order to retain said flashlight in a desired position.*

*25. The method of claim 24, wherein said wrapping step comprises:*

*forming said portion of said elongated flexible member into a loop, wherein a portion of said object is contained within said loop.*

*26. The method of claim 24, wherein said object is at least one of a pipe, rod, and engine part.*

*27. The method of claim 24, wherein the female end portion of a first segment of the plurality of discrete, rotatably interconnected segments has an inner surface comprising a frustum of a sphere and dimensioned to receive the male end portion of an adjacent second segment of the plurality of discrete, rotatably interconnected segments to permit relative rotational movement between the first and second segments and after said wrapping step said elongated flexible member is in a desired shape and further comprising:*

*maintaining said elongated flexible member in said desired shape.*

*28. A method for positioning a flashlight, comprising:*

*providing a flashlight engaged with an elongated flexible member which is capable of being formed into a plurality of differing shapes by means of a plurality of discrete, rotatably interconnected segments in the elongated flexible member with each of the plurality of discrete, rotatably interconnected segments having at least one of a male end and a female end for engaging one of a female end and male end respectively of an adjacent discrete, rotatable interconnected segment;*

*forming at least a portion of said elongated flexible member into a desired shape comprising a base for resting on a support surface and a generally vertically extending portion projecting upwardly from the base; and*

*retaining the at least a portion of said elongated flexible member in the desired shape.*

*29. The device of claim 17, wherein:*

*the flashlight comprises a power source connected to an end of the elongated flexible member.*

*30. The device of claim 17, wherein:*

*each of the plurality of discrete, rotatable connected segments comprises a passage extending therethrough.*

* * * * *

UNITED STATES PATENT AND TRADEMARK OFFICE

CERTIFICATE OF CORRECTION

PATENT NO. : RE 36,883
DATED : September 26, 2000
INVENTOR(S) : Krenzel

It is certified that error appears in the above-identified patent and that said Letters Patent is hereby corrected as shown below:

Column 1,
Please insert the following paragraph before the first paragraph:

-- Notice: More than one reissue application has been filed for the reissue of U.S. Patent No. 5,276,596. The reissue applications are 08/582,272 issued as the present patent, U.S. Patent No. RE 36,883, and Patent Application No. 09/608,490 filed on June 30, 2000. --

Signed and Sealed this

First Day of April, 2003

JAMES E. ROGAN
*Director of the United States Patent and Trademark Office*